Jan. 9, 1923.
G. A. SMALL.
COMPOSITE TUBE AND METHOD OF MAKING THE SAME.
FILED FEB. 4, 1921.
1,441,459
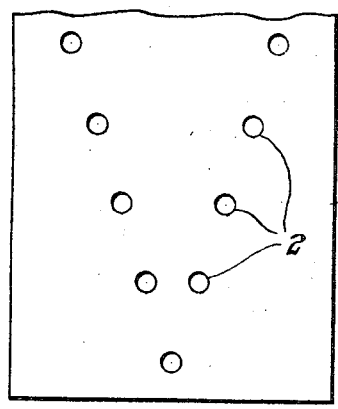
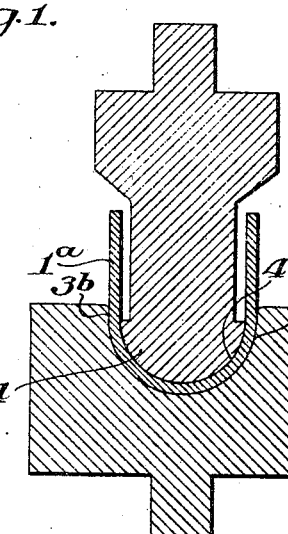
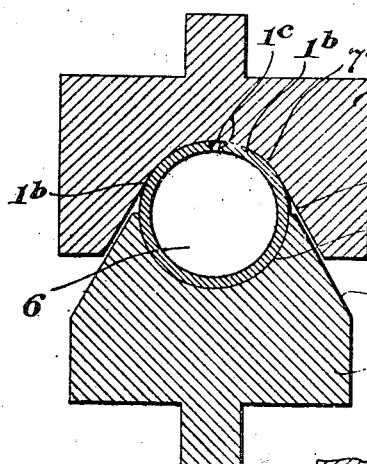
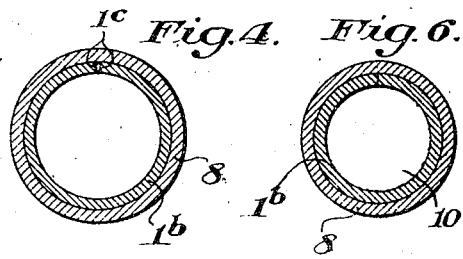
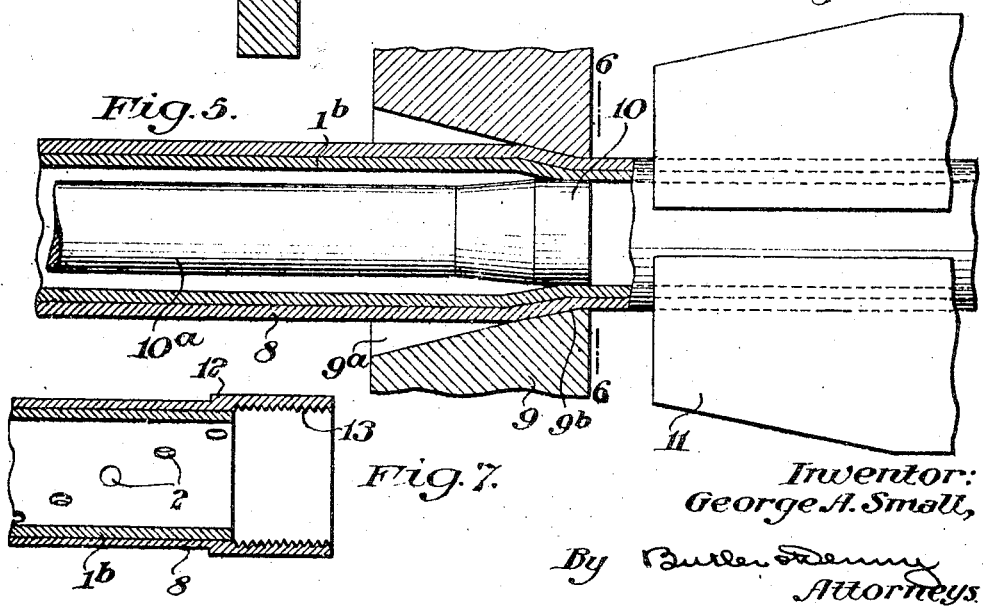
Inventor:
George A. Small,
By Butler Denny
Attorneys.

Patented Jan. 9, 1923.

1,441,459

UNITED STATES PATENT OFFICE.

GEORGE A. SMALL, OF PHILADELPHIA, PENNSYLVANIA, ASSIGNOR TO PHILADELPHIA BRONZE BEARING & TUBE COMPANY, OF PHILADELPHIA, PENNSYLVANIA, A CORPORATION OF DELAWARE.

COMPOSITE TUBE AND METHOD OF MAKING THE SAME.

Application filed February 4, 1921. Serial No. 442,348.

*To all whom it may concern:*

Be it known that I, GEORGE A. SMALL, a citizen of the United States, residing in the city of Philadelphia, county of Philadelphia, and State of Pennsylvania, have invented an Improved Composite Tube and Method of Making the Same, of which the following is a specification.

My invention is designed to provide composite tubing adapted for different uses but particularly for use as bearings, and in a usual form it comprises a seamless steel tube or cylindrical shell cold drawn down upon a tubular bronze lining or bushing having a longitudinal joint with abutting edges pressed together by the action of the shell and the pressure upon the bushing therein as it is cold drawn, by which the shell and bushing are fixed together in concentric relation, the edges of the bushing are forced together, and the inner surface of the bushing is worked, refined, consolidated, hardened, formed and burnished. A bearing tube formed in accordance with my invention may have its bushing provided with oil or grease retaining recesses, and its shell may be provided with connecting means such as threads and shoulders which are ordinarily not satisfactorily applied to bearings composed wholly of bearing metal.

In the preferred practice of my method, there is provided a sheet or blank of bearing metal (as annealed and cleaned bronze) of the length, width and thickness necessary for forming the desired bushing, which may be grooved, perforated or stamped to furnish staggered recesses for holding a lubricant. This blank, which may be flat, is formed by dies first into a channel of approximately U-shaped cross-section and then into a tube having a longitudinal separation or juxtaposed longitudinal edges. This tube is telescoped within a seamless steel tube or cylindrical shell with which it makes a close slip fit preferably. The laminated tube of different metals is then cold drawn, simultaneously through a reducing die and over a drawing plug or head whose conjoint actions effect the flow of the metal of the shell with its contraction upon the bushing or lining which is subjected thereby and by the drawing head therein to forces which tend to flow the metal thereof circumferentially as well as longitudinally and press the longitudinal edges together in correct abutting relation, with the production of a tight joint by abutting edges that have been caused to conform and are held in compression by the tension of the shell, in the preferred construction. The cold drawing may contract the shell without substantially reducing the diameter of the lining, which may have its edges pressed together before inserting it in the shell, or the lining together with the shell may be reduced in diameter by the cold drawing. The interior or bearing surface of the bushing or lining is worked, refined, hardened, formed to a finish and given a high polish by the action of the drawing head.

The composite tube thus formed may be cut into suitable lengths and the shell provided with such threads or shoulders as may be desired and which cannot be formed satisfactorily in metals adapted for linings.

The blank from which the bushing is formed may have any desired character (as to hardness, toughness and refinement) initially, that will permit it to be worked, but it is to be brought to the desired final degree of hardness, toughness and refinement by working done by the drawing head, either by a single or repeated passes.

In the drawings, Fig. 1 is a plan view of a perforated blank from which the lining of my composite tube may be formed; Fig. 2 is a transverse sectional view in illustration of an operation for initially bending the blank to the form of a channel by means of dies; Fig. 3 is a transverse sectional view in illustration of a further bending operation to form the channel into a tube with a longitudinal opening between juxtaposed edges by means of further dies; Fig. 4 is a transverse sectional view of a seamless tube or cylindrical shell with the bearing tube or lining telescoped therein; Fig. 5 is a part sectional and side view in illustration of the mechanism and operation by which the composite tube members are reduced and consolidated with the firm closure of the joint of the inner tube, the firm pressure of the abutting longitudinal edges together in conforming relation so as to seal the joint, work the metal, and finish the inner bearing surface; Fig. 6 is a cross sectional view on the line 6—6 of Fig. 5 in illustration of the composite tube with the drawing head therein; and Fig. 7 is a longitudinal section of a fragment of a composite tube embodying my improvements.

The drawings illustrate steps which are employed in the preferred practice of my invention and a finished product adapted to be formed thereby.

As illustrated, a blank 1 of bearing metal, such as bronze, is provided with the perforations or recesses 2 and subjected to the swaging action of the dies 3 and 4 which are adapted to form such blank into a channel 1ª of substantially U-shaped cross section with a semi-cylindrical section connecting its sides, the channel in the female die 3 having preferably arcuate cross section 3ª of approximately 180° and sides 3ᵇ approximately tangential thereto and the head of the male die 4 having a cylindrical surface 4ª.

The channel 1ª is then placed with its cylindrical sections in the female die 5 and is bent around a cylindrical mandrel 6 placed therein, by a female die 7, these dies having therein the respective cylindrical channels 5ª and 7ª and the respective flaring longitudinal sides 5ᵇ and 7ᵇ adapted to register.

The tube 1ᵇ is thus formed with the juxtaposed longitudinal edges 1ᶜ, which may vary in their relations in accordance with the thickness of the metal and the pressure or work to which they are subjected.

The tube 1ᵇ is telescoped within a seamless tube or cylindrical shell 8 preferably of steel. The composite tube comprising the members 1ᵇ and 8 is now engaged and drawn by the jaws 11, through the female die 9 (having a tapered opening 9ª terminating in a contracted bearing 9ᵇ) and over the male die, drawing head or plug 10 supported centrally in the bearing of the female die by the rod 10ª. In this operation, the tubes 1ᵇ and 8 are drawn down in diameter by flowing the metal of each of them so that the edges 1ᶜ are forced together in conforming and the closest practicable relation and the inner and outer tubes are pressed together in the closest practicable relation and fixed in such relation.

The resulting tube may be cut into convenient lengths and provided with a shoulder 12 and threads 13 to produce the bearing illustrated in Fig. 7.

By my invention there is produced without waste, economically and efficiently, a superior composite tube suitable for bearings, comprising laminæ (of variable relative thicknesses and properties) fixed together permanently by the external and internal pressures to which they are subjected by drawing and flowing the metal of such laminæ. My method avoids the necessity for heating, welding, brazing, or soldering the metal together with the internal strains, distortions and irregularities incident to such operations. Moreover, these bearing tubes of composite character can be made by combining metals having the different characteristics required for the duty of the bushing in relation to a journal and for the duty of the shell in relation to the bushing and to the holding means.

Having described my invention, I claim:

1. A composite tube comprising a seamless metal shell and fixed therein to the inner surface thereof a bushing of different metal having a tightly closed longitudinal butt joint.

2. A composite tube comprising a metal lining having a longitudinal butt joint and an outer seamless tube of different metal compressed inwardly against said lining and tightly closing said joint.

3. A composite tube comprising a tubular metal lining having a longitudinal butt joint and an outer shell of different metal, said joint being closed and said lining and shell fixed together by conditions induced therein by compression.

4. A composite bearing tube comprising a seamless metal tube provided with an integal shoulder and fixed therein a tube of different metal having a longitudinal butt joint tightly closed by pressure.

5. A composite bearing tube comprising an outer seamless metal tube having an inner thread in an end thereof and fixed in said outer tube to the inner surface thereof a bushing of different metal having a tightly closed longitudinal butt joint.

6. The method of making composite tubing which comprises cold drawing together a seamless outer tube and an inner tube having juxtaposed longitudinal edges and thereby contracting said tubes and pressing said edges together.

7. The method of making composite tubing which comprises cold drawing together a seamless outer tube and an inner tube having juxtaposed longitudinal edges, and reducing the diameters of each of said tubes, pressing said edges together and finishing the inner surface of said inner tube by said drawing.

8. The method of making composite tubing which consists in cold drawing and fixing together an outer and an inner tube by means of exterior and interior dies acting on the outer and inner surfaces of said tubes respectively.

9. The method of making composite tubing which consists in pressing a metal blank to channel form, pressing said channel form to cylindrical form, placing said cylindrical form in a conforming tube; and drawing said tubes so as to fix them together.

10. The method of making composite tubing which consists in pressing a blank to channel form, then to a cylindrical form having juxtaposed longitudinal edges, telescoping said cylindrical form in a tubular shell, and drawing said tubes so as to flow the metal thereof, fix said tubes together and press said edges together.

Signed at Philadelphia, in the county of Philadelphia and State of Pennsylvania, this 2nd day of February, 1921.

GEORGE A. SMALL.